Feb. 1, 1966          J. N. NICOLAOU          3,233,145
PEAKING AND FOCUSING MECHANISM FOR SOLID STATE
DEVICES WITH SWEEPING, SCANNING AND MODULATION
FUNCTIONS DERIVED THEREOF
Filed Aug. 7, 1961                                      3 Sheets-Sheet 1
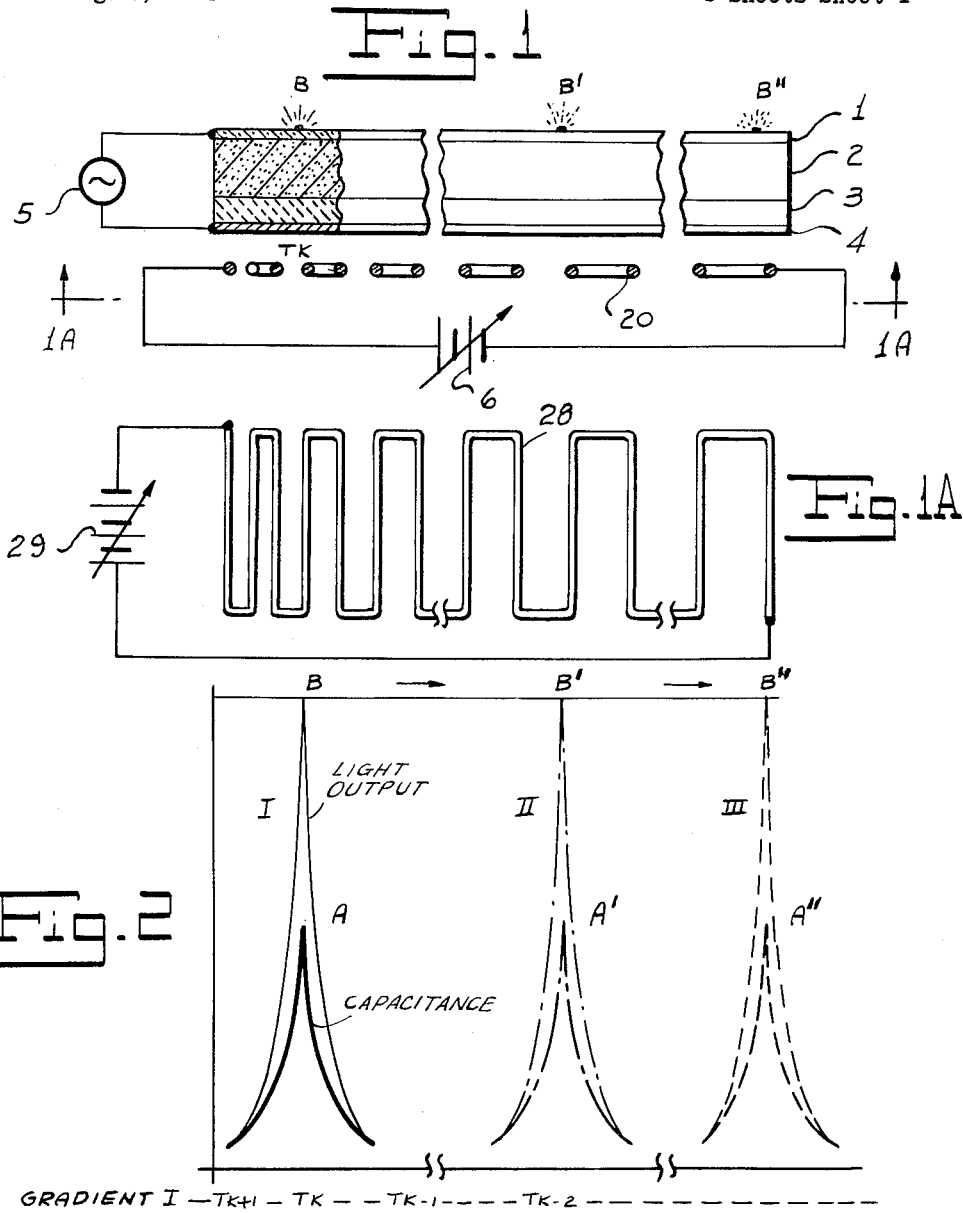
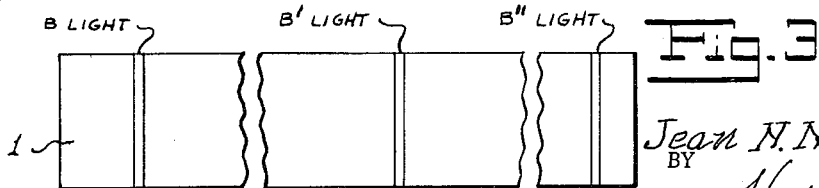
INVENTOR.
Jean N. Nicolaou,
BY
Harry B. Kook,
ATTORNEY

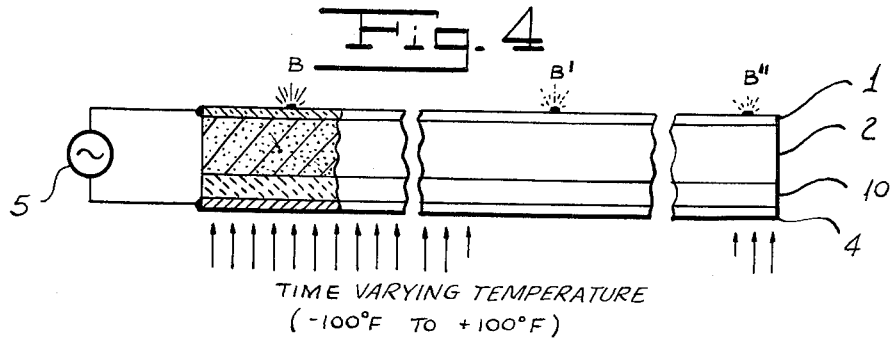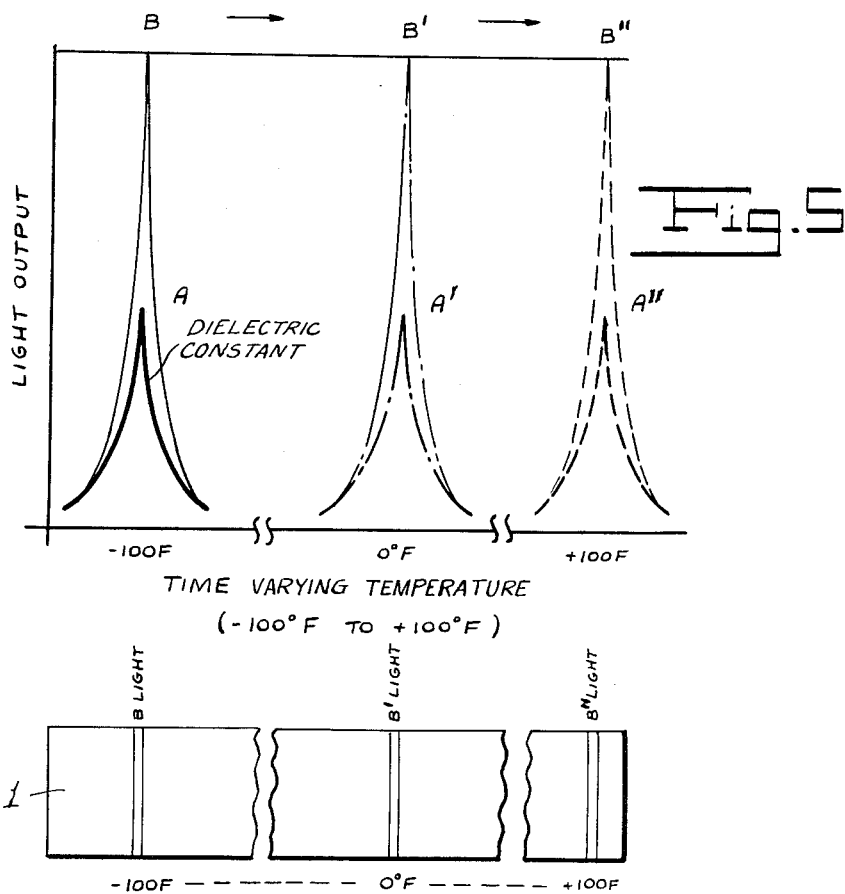

UNITED STATES PATENT OFFICE 3,233,145
Patented Feb. 1, 1966

3,233,145
PEAKING AND FOCUSING MECHANISM FOR SOLID STATE DEVICES WITH SWEEPING, SCANNING AND MODULATION FUNCTIONS DERIVED THEREOF
Jean N. Nicolaou, Ormond Beach, Fla., assignor to Electro-Tec Corp., South Hackensack, N.J., a corporation of New Jersey
Filed Aug. 7, 1961, Ser. No. 129,840
5 Claims. (Cl. 315—71)

This application is a continuation-in-part of my copending application Serial No. 832,290, filed August 7, 1959, now Patent No. 2,910,710.

Focusing, scanning and display devices of the prior art generally utilize electron beams or assemblies of discrete active elements, or mosaics with a large number of electrical connections.

Objects of the invention are to provide novel and improved focusing and scanning mechanisms, of the type which include large-area solid state devices, for example layers of certain electronic materials arranged in sandwich fashion; and to provide such a mechanism wherein the region of focus shall be controlled in a novel and improved manner.

Another object of the present invention is to provide a novel and improved focusing and scanning mechanism which makes it possible to produce displays of exceptionally large size and which shall avoid the complexities and limitations of prior devices and which shall be simple in construction and operation.

In its broader aspect, the invention utilizes the peaking characteristics that layers of certain materials arranged in sandwich fashion exhibit under suitable excitation energy. The application, development and distribution of said excitation energy is in a lateral direction parallel to the plane of said layers and provide a novel focusing and scanning mechanism suitable for large-area solid state devices. In the alternative, a uniform excitation energy may be applied to a layer of material having a lateral gradient of response.

A shift in the level of excitation energy while maintaining a constant lateral gradient thereof results in a lateral shift of peaking which in turn produces a corresponding lateral shift of region of focus; and control signal, orthogonal to the layers of the peaking produces a corresponding control at the region of focus.

The invention further contemplates the utilization of the non-linear current-voltage characteristic in a pair of layers of certain material with a pair of voltage gradients in opposite direction and complementary magnitude to provide a set of layers with a peaking characteristic.

In order to make clear the meaning of certain terms hereinbefore mentioned and to be used hereinafter, the following glossary of terms is provided:

Peaking characteristic: Shall denote the property of certain materials to exhibit a characteristic response curve to a given excitation energy which curve rises sharply from a low level of response to a peak level of response and drops sharply from said peak level back to a low level over a critical region of excitation energy as said excitation energy is varied through said region.

The following are exemplary of the above-defined peaking characteristic:

(1) It is known that if a ferroelectric material is subjected to a varying temperature, including a temperature region about the Curie temperature of the ferroelectric material, the dielectric constant of the ferroelectric material along the ferroelectric axis, within the said temperature region, will rise sharply from a first low value below the Curie temperature to a peak value at said Curie temperature, and drop sharply from said peak value to a second low value above said Curie temperature; said second low value may or may not be the same as said first low value. The direction of variation of temperature through said region may be reversed and a similar dielectric constant variation will result.

(2) It is known that if a ferroelectric material is subjected to a varying electric field directed along the ferroelectric axis of said material and including the electric field regions about the coercive field strength of the said material for both polarities of the applied electric field, the dynamic dielectric constant along the ferroelectric axis will rise sharply from a first low value below the coercive field strength to a peak value at said coercive field strength, and drop sharply from said peak value to a second low value above said coercive field strength as the magnitude of the applied electric field is increased from some low value below said coercive field strength to some high value above said coercive field strength; said second low value of the dynamic dielectric constant may or may not be the same as said first low value. Upon reversing the direction of variation of the applied electric field strength from its high value the dynamic dielectric constant will remain at some low value until the applied field is reversed in polarity and approaches in magnitude said coercive field strength in this reverse direction. Thereupon a similar dynamic dielectric constant variation will result as the applied electric field passes through the region of the coercive field.

(3) If a first non-linear resistance material is combined in a laminate with another non-linear resistance material having a similar current-voltage response characteristic, a voltage excitation of these materials, in the laminate, in opposite directions of increasing voltage will result in a high conductivity region through the laminate, in which the peak value of conductivity through the laminate is that value common to the response characteristics of both of said materials. In all other regions of the laminate, the net conductivity through the laminate is low relative to said peak value of conductivity.

Lateral gradient of excitation: Shall denote the rate of change of excitation energy with distance and in a direction parallel to the plane of a solid state sandwich. The excitation energy is directed through layers of the sandwich.

Lateral gradient of response: Shall denote the rate of change of response to a uniform excitation energy sensitivity with distance in the layers of certain materials, said rate of change being in a direction parallel to the plane of the sandwich.

Focusing mechanism: Shall denote the means by which excitation energy applied to a solid state sandwich is concentrated at a selected region in a preselected layer of said sandwich by an alteration of electrical characteristics at and adjacent to said region.

While the invention may be embodied in a wide variety of devices or apparatus, a few examples of possible devices or applications of the invention are illustrated in the accompanying drawings wherein FIGURE 1 is a schematic representation of one device embodying the focusing and scanning principle of the invention and wherein there is a thermal excitation energy gradient, and illustrating the shifting of the point of focus;

FIGURE 1A is a bottom view of the sandwich and the electrical heating coil therefor;

FIGURE 2 is a graph or diagram of the capacitance and light output versus thermogradient;

FIGURE 3 is a plan view of the layered sheet structure or sandwich of FIGURE 1 showing the narrow luminous regions of focus;

FIGURE 4 is a view similar to FIGURE 1 wherein the lateral gradient of excitation energy is a time varying temperature;

FIGURE 5 is a view similar to FIGURE 2 illustrating the capacitance and light output characteristics as a function of temperature of the device shown in FIGURE 4;

FIGURE 6 is a plan view of the layered sheet structure or sandwich of FIGURE 4 illustrating the shifting of the narrow luminous region;

Figure 7:
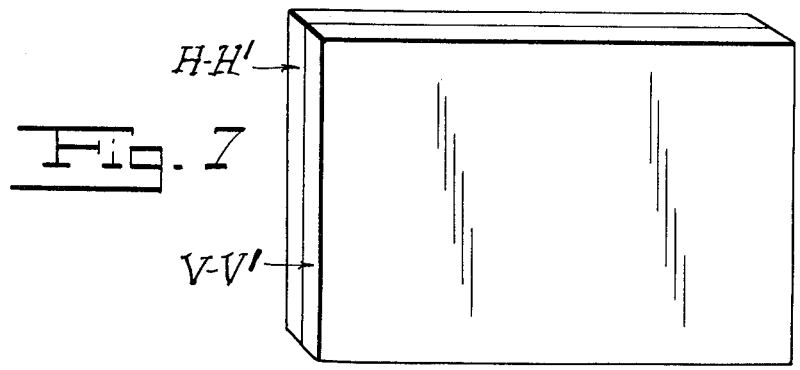
FIGURE 7 is a perspective view of a multiple layer unit which consists of combinations of two of the layered structures or sandwiches shown in FIGURES 1, 4, and 7.

The invention in one of its simplest forms is embodied in the device of FIGURE 1. This is a combination which, by superposition of the dielectric constant peaking characteristic of layer 3 with the imposed thermogradient in layer 3, comprises a focusing mechanism evidenced by light emission from layer 2.

The sandwich, a part of which is illustrated in cross-section by FIGURE 1, comprises a transparent conducting layer 1, an electroluminescent layer 2, a polar layer 3 made of for example a ferroelectric ceramic, a mixture 71 percent $BaTiO_3$ and 29 percent $SrTiO_3$, 8 mils thick, and a base conducting layer 4. A lateral thermal gradient is imposed in the ferroelectric ceramic layer by any well-known method of producing such gradients; one of which is shown as a zig-zag electrical resistance coil 28 connected in circuit with an adjustable source of voltage 29 and whose loops are spaced apart by different distances along the length of the sandwich.

Since the characteristic of the ferroelectric ceramic is such that the dielectric constant is much higher at the Curie temperature $T_k$ (FIGURE 2) than at temperatures above or below $T_k$, the resulting capacitance of a region at the temperature $T_k$ of the ferroelectric ceramic relative to the capacitance of the electroluminescent layer at said region is such that a considerably greater percentage of the imposed voltage appears across the electroluminescent layer and less voltage appears across the ferroelectric layer than at any other region in the sandwich. This causes the sandwich to luminesce at said region. The lower curve for each of the gradients I, II, III shown in FIGURE 2 represents this change in capacitance with temperature of the ferroelectric. The upper curve representing an even sharper focusing effect is brought about by the non-linear characteristics in the electroluminescent layer itself. This means that a small increase in voltage across the electroluminescent layer will produce a large change in the amount of light produced. While the latter effect is not essential to produce focusing by the peaking characteristic, it is apparent that it will greatly enhance the usefulness of the device so produced.

When the temperature gradient is modified from gradient I to gradient II to gradient III (FIGURE 2), the position of the Curie temperature $T_k$ shifts from B to B' to B'' and with it there is a corresponding shift in the region at which the dielectric constant of the ferroelectric layer is at a maximum or peak value.

If the device by which the initial temperature gradient is produced is electrical in nature, it is seen that we have here a device by which a luminous line can be positioned by electrical means. Hence this device, in its present form, could be useful as a meter.

Also, since it is well known that a thermal gradient will shift upward or downward (as an entire gradient) with shifting ambient temperature, it is seen that the device can be utilized as a temperature indicating device.

FIGURE 2 shows a graph of capacitance and light output versus thermogradient. The capacitive peaking A and the corresponding light concentration at point B indicates the focusing.

FIGURE 3 is a plan view of the layered sheet structure of FIGURE 1. Only the transparent conducting layer is shown with the narrow luminous region shifting towards the right end for a corresponding shifting of the Curie temperature $T_k$ of the thermogradient as shown in FIGURE 2.

A second simple embodiment is shown by FIGURE 4. This is a combination which by superposition of the dielectric constant peaking characteristic of dielectric layer 10 with a built-in lateral gradient of response and the light emission characteristic of layer 2 comprises a light focusing mechanism. The layered sheet structure of which a cross-sectional part is shown by FIGURE 4, comprises a transparent conducting layer 1, an electroluminescent layer 2, and a dielectric layer 10 with a built-in lateral response gradient, and a conductive layer 4. Aforesaid gradient may be formed by means of varying the mixture ratio; 100 percent strontium titanate at point A, 55 percent $BaTiO_3$-45 percent $SrTiO_3$ at point A', and 75 percent $BaTiO_3$-25 percent $SrTiO_3$ at point A''. An adjustable source of alternating voltage 5 is connected to the left edge of layers 1 and 4 and adjusted for the threshold of light emission. A time-varying temperature starting from for example approximately −100° F. and up to 100° F. is uniformly applied along the length of layer 4 and thereby to the dielectric layer 10. Because of its built-in response gradient, the dielectric layer 10, about the first point A, will exhibit a peak in capacitance with corresponding light emission in a region about the point A. As the temperature increases with time a shift of the capacitance peak of the dielectric layer 10 occurs with a corresponding shift of the light emitting region in the electroluminescent layer 2. Point A' will emit light when the temperature reaches 0° F. and as a further example, the region in the electroluminescent layer 2, about the point A'' will emit light when the temperature reaches 100° F. This lateral shifting of the region of light emission with increase in temperature provides a scanning mechanism very useful for many indicating instrument applications. The shifting of the region of light emission and the resulting line configuration of said region through positions B, B' and B'' is diagrammatically illustrated in FIGURE 6.

Figure 8:
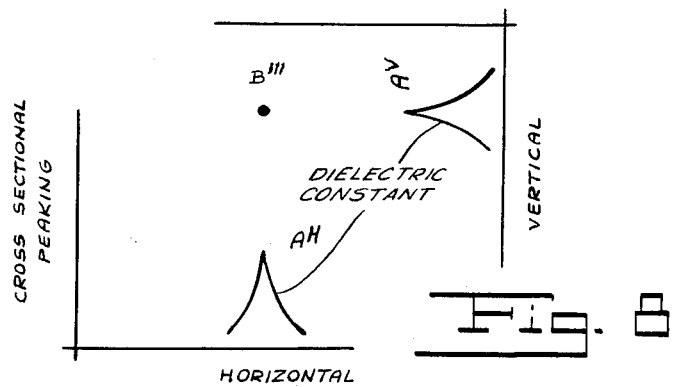
FIGURE 8 is a diagram illustrating the peaking characteristics occurring in each of the multiple layer units shown in FIGURE 7.
Figure 9:
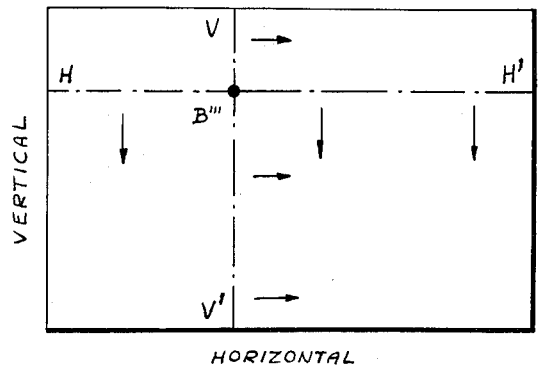
FIGURE 9 is a diagram illustrating the sandwich in plan view and showing two lines of peak conductivity intersecting at a point where a spot of low impedance occurs and which can be utilized with electroluminescent or other devices.

A third complex embodiment is shown by FIGURE 7 and comprises a multiple layer unit in which two of the units hereinbefore described are combined, with certain minor modifications such as varying the thickness of the layers in the direction of the excitation or the response gradient and omitting one of the two electroluminescent layers. These two units are constructed so that the gradient of response or the gradient of excitation (not specified) appear in a direction in one layer which is 90° from the direction appearing in the second unit. This provides for a line region of peaking in each of two, orthogonal, lateral dimensions of the device. Where these two line regions of peaking intersect, a spot region of peaking occurs. By positioning the line regions, the spot region can be made to move in any desired fashion across the layers. More specifically referring to FIGURE 10, this is a combination by superposition of a line-peaking mechanism H–H' in the horizontal direction with a line-peaking mechanism V–V' in the vertical direction to produce a resultant point-peaking mechanism $A^H$–$A^V$ the position of which is determined by the relative magnitude of a horizontal excitation gradient and a vertical excitation gradient. It should be noted that these two gradient mechanisms might not be identical in function. A lateral response gradient might be utilized in one direction and a lateral gradient of excitation energy in the other. Further, the type of excitation, i.e., temperature, electrical field, etc., may be different in horizontal and vertical directions. The further combination with an electroluminescent layer produces a luminous point of focus B''' which can be shifted horizontally and vertically thereby providing a scanning mechanism for television or other display applications. FIGURE 8 shows functionally the peaking and focusing occurring in each of the two dimensions, while FIGURE 9 shows the two line regions of peaking intersecting at a point region B'''.

This combination provides a spot region focusing and sweeping mechanism, and in conjunction with simple modulation schemes, such as varying of A.C. voltage imposed across the entire sandwich, this device becomes a useful element for variable intensity display devices, such as TV screens, etc. Since this embodiment is a new combination of old elements which have been previously described in detail herein, it is considered that a detailed description of this embodiment will be a repetition and therefore it has been omitted.

The range of practical applications derived from this invention comprises the following items:

(a) Visual information and picture display screens for television and radar.

(b) Visual information and picture pick-up screens for television playhouses.

(c) Motion picture screens for video tape recorders.

(d) Electronic scanning means for radar.

(e) Differential indicators and sensors of temperature, humidity, pressure, frequency and radiation for high speed applications.

(f) Potentiometers with the focusing mechanism as a substitute for the point of contact.

It will be understood by those skilled in the art that there may be different combinations of the material layers which manifest the "focusing" or "peaking" phenomenon and the luminescense, or other effect, respectively, and many different materials may be utilized in making said layers, all within the spirit and scope of the invention.

I claim:

1. An energy distribution system comprising
   (a) a first layer of material having a dielectric constant which varies with temperature and exhibits a maximum dielectric constant at a critical temperature,
   (b) a layer of electroluminescent material in electrical contact with said first layer,
   (c) means for connecting an electrical potential across the combination of said first layer and said electroluminescent layer,
   (d) thermal energy producing means, in thermal communication with said first layer, for providing a gradient of temperature along one dimension of said first layer, and
   (e) means connected to said thermal energy producing means for varying the amount of energy produced by said thermal energy producing means, whereby said critical temperature is moved along said dimension of said first layer.

2. An energy distribution system comprising:
   (a) a first layer of material having a dielectric constant which varies with temperature and exhibits its maximum dielectric constant at a critical temperature,
   (b) a first electrode attached to one side of said first layer,
   (c) a layer of electroluminescent material attached to the other side of said first layer,
   (d) a second electrode attached to said electroluminescent layer,
   (e) means for connecting a source of electrical energy across said first and second electrodes,
   (f) thermal energy producing means for producing a temperature gradient along a dimension of said first layer, and
   (g) means for varying the amount of energy produced by said thermal energy producing means for moving said critical temperature along said dimension of said first layer.

3. An energy distribution system as claimed in claim 2 wherein said second electrode is transparent.

4. An energy distribution system comprising
   (a) a first layer of ferroelectric material,
   (b) a layer of electroluminescent material in electrical contact with said layer of ferroelectric material,
   (c) means for applying an electrical potential across the combination of said layer of ferroelectric material and said electroluminescent material,
   (d) thermal energy producing means, in thermal communication with said layer of ferroelectric material for producing a temperature gradient along a dimension of said ferroelectric layer, and
   (e) means for varying the amount of thermal energy produced by said thermal energy producing means, whereby the Curie temperature of said ferroelectric material is caused to move along said dimension of said ferroelectric layer.

5. An energy distribution system comprising
   (a) a first material having a dielectric constant which varies with temperature and exhibits a peak dielectric constant at a first critical temperature,
   (b) a second material having a dielectric constant which varies with temperature and exhibits a peak dielectric constant at a second critical temperature,
   (c) a first layer formed of a proportional mixture of said first and second materials, said proportion varying along a selected dimension thereof, whereby said layer exhibits a gradient of critical temperature values along said selected dimension,
   (d) a layer of electroluminescent material in electrical contact with said first layer,
   (e) means for connecting an electrical potential across the combination of said first layer and said electroluminescent layer, and
   (f) thermal energy producing means in thermal communication with said first layer for controlling the temperature of said first layer.

References Cited by the Examiner

UNITED STATES PATENTS 2,942,131   6/1960   Diemer et al. _____ 315—169

FOREIGN PATENTS 1,117,682   2/1956   France.

JOHN W. HUCKERT, *Primary Examiner.*

JAMES D. KALLAM, DAVID J. GALVIN, *Examiners.*